(12) United States Patent
Lake et al.

(10) Patent No.: US 12,158,559 B2
(45) Date of Patent: Dec. 3, 2024

(54) PEST DETECTION USING SENSOR WITH TEXTURED SURFACE

(71) Applicant: Ecolab USA Inc., Saint Paul, MN (US)

(72) Inventors: Larry Arvid Lake, Woodbury, MN (US); Morgan Ann Manderfield, Inver Grove Heights, MN (US); Joelle Francine Olson, Hanover, MN (US); Liliana Reategui, Saint Anthony, MN (US); Daniel Ronald Schwartz, Eagan, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 17/455,875

(22) Filed: Nov. 19, 2021

(65) Prior Publication Data

US 2022/0155477 A1 May 19, 2022

Related U.S. Application Data

(60) Provisional application No. 63/116,066, filed on Nov. 19, 2020.

(51) Int. Cl.
*G01V 3/02* (2006.01)
*A01M 99/00* (2006.01)

(52) U.S. Cl.
CPC .............. *G01V 3/02* (2013.01); *A01M 99/00* (2013.01); *A01M 2200/011* (2013.01)

(58) Field of Classification Search
CPC ... G01V 3/02; A01M 99/00; A01M 2200/011; A01M 1/103; A01M 1/023; A01M 1/026
USPC ........................................................ 324/686
See application file for complete search history.

(56) References Cited

U.S. PATENT DOCUMENTS

| | | | |
|---|---|---|---|
| 6,937,156 B2 | 8/2005 | Gardner, Jr. et al. | |
| 7,839,282 B1 | 11/2010 | Mathur et al. | |
| 8,919,211 B1 | 12/2014 | Hanson et al. | |
| 10,524,461 B1* | 1/2020 | Files | G01S 13/888 |
| 10,561,135 B2* | 2/2020 | Sandford | A01M 1/145 |
| 10,736,309 B1* | 8/2020 | Cogley | H04M 1/72409 |
| 2001/0009399 A1* | 7/2001 | Barber | A01M 31/002 43/132.1 |

(Continued)

FOREIGN PATENT DOCUMENTS

| | | |
|---|---|---|
| BR | 112017014922 A2 | 3/2018 |
| CN | 107404866 A | 11/2017 |

(Continued)

OTHER PUBLICATIONS

Dean, Robert N., et al. "Capacitive fringing field sensors in printed circuit board technology." 2010 IEEE Instrumentation & Measurement Technology Conference Proceedings. IEEE, 2010. (Year: 2010).*

(Continued)

*Primary Examiner* — Christopher P McAndrew
(74) *Attorney, Agent, or Firm* — Schwegman Lundberg & Woessner, P.A.

(57) ABSTRACT

A pest detection device including a capacitive sensor having a plurality of traces that can be capacitively sensed using self-capacitance or mutual capacitance measurements. The sensor including conductive shield traces to facilitate a number of sensing applications. The sensor including a coated portion to facilitate crawling of pests over the sensing area of the circuit board.

24 Claims, 9 Drawing Sheets

(56) References Cited

U.S. PATENT DOCUMENTS

| | | | |
|---|---|---|---|
| 2003/0184442 A1* | 10/2003 | Gardner, Jr. | A01M 31/002 340/573.2 |
| 2007/0236356 A1 | 10/2007 | Zhang et al. | |
| 2009/0223115 A1* | 9/2009 | Lang | A01M 1/14 43/123 |
| 2012/0151823 A1* | 6/2012 | Donoho | A01M 1/026 43/123 |
| 2013/0219771 A1* | 8/2013 | Black | A01M 1/14 43/132.1 |
| 2014/0111019 A1 | 4/2014 | Roy et al. | |
| 2014/0115950 A1 | 5/2014 | Chornenky | |
| 2014/0239982 A1 | 8/2014 | Alameh et al. | |
| 2014/0239984 A1 | 8/2014 | Alameh et al. | |
| 2014/0292351 A1 | 10/2014 | Ivanov | |
| 2017/0303523 A1* | 10/2017 | Sandford | F21S 8/035 |
| 2017/0354139 A1* | 12/2017 | Vickery | A01M 23/16 |
| 2018/0235205 A1* | 8/2018 | Howard | A01M 23/30 |
| 2018/0325093 A1* | 11/2018 | Vickery | A01M 23/18 |
| 2019/0200594 A1* | 7/2019 | Naylor | A01M 1/14 |
| 2019/0239498 A1* | 8/2019 | Moore | G08B 21/00 |
| 2019/0289840 A1* | 9/2019 | Kaye | A01M 23/00 |
| 2019/0347368 A1* | 11/2019 | Duff | G02B 27/0172 |
| 2020/0113165 A1* | 4/2020 | Sandford | F21S 8/035 |
| 2020/0146275 A1* | 5/2020 | Olson | A01M 25/004 |
| 2020/0214280 A1 | 7/2020 | Sandford et al. | |
| 2020/0253187 A1* | 8/2020 | Files | A01M 19/00 |
| 2021/0185998 A1* | 6/2021 | Siler | A01M 23/30 |
| 2024/0201409 A1 | 6/2024 | Lake et al. | |

FOREIGN PATENT DOCUMENTS

| | | |
|---|---|---|
| EP | 3270689 A1 | 1/2018 |
| EP | 3270689 A4 | 1/2019 |
| HK | 1243595 A1 | 7/2018 |
| JP | 2018-500915 A | 1/2018 |
| KR | 20080098275 A | 11/2008 |
| KR | 20080100722 A | 11/2008 |
| MX | 2017009109 A | 4/2018 |
| WO | WO-1996007966 A1 | 3/1996 |
| WO | WO-2015143633 A1 | 10/2015 |
| WO | WO-2016073429 A1 | 5/2016 |
| WO | WO-2016/115107 A1 | 7/2016 |
| WO | WO-2020/097523 A1 | 5/2020 |
| WO | WO-2022/109609 A1 | 5/2022 |

OTHER PUBLICATIONS

Lim, Michele Hui Fern, Jacobus Daniel van Wyk, and Fred C. Lee. "Hybrid integration of a low-voltage, high-current power supply buck converter with an LTCC substrate inductor." IEEE Transactions on Power Electronics 25.9 (2010): 2287-2298. (Year: 2010).*

"International Application Serial No. PCT/US2021/072531, International Search Report dated Mar. 28, 2022", 4 pgs.

"International Application Serial No. PCT/US2021/072531, Written Opinion dated Mar. 28, 2022", 5 pgs.

"Australian Application Serial No. 2021382808, First Examination Report mailed Apr. 30, 2024", 3 pgs.

* cited by examiner

PEST DETECTION USING SENSOR WITH TEXTURED SURFACE

CLAIM OF PRIORITY

This patent application claims the benefit of priority to U.S. Provisional Application Ser. No. 63/116,066, filed Nov. 19, 2020, which is incorporated by reference herein in its entirety.

TECHNICAL FIELD

The present disclosure pertains to methods and apparatus for pest detection devices, and more particularly to methods and apparatus for a pest detection device with a textured portion that allows pests to crawl across the portion.

BACKGROUND

A number of devices are used to detect pests. One such device is an electronic sensor that detects the presence of a pest by measuring a change in capacitance due to a pest's presence on a capacitive sensor. If there is any incline to the sensing surface there are some pests that cannot crawl over the surface, because it may be too slippery for them to climb on. These pests will not be sensed because they will go around the sensing portion of a device rather than over it.

Certain pests, such as bed bugs, are climbers but may have difficulty climbing on a smooth sensing surface, especially if a conformal coating is applied to the sensing surface. Bed bugs climb using claws that enable them to "hook" onto surface irregularities or features to pull themselves up an incline. Therefore, a smooth sensor mounted at an incline would not give an accurate determination of the presence and number of bed bugs because the sensor is not a typical climbing surface.

Another problem with present sensors is that smaller pests may be difficult to detect based on the sensor design. For example, a sensor that is configured for a certain insect of a certain size may not detect smaller insects, therefore also rendering inaccurate sensing results.

There is a need in the art for an improved pest detection device that will better detect climbing pests. Such a device should be constructed to allow climbing pests to more naturally crawl across the surface. The device should also be configured to more accurately detect pests of various sizes.

SUMMARY

Figure 1:
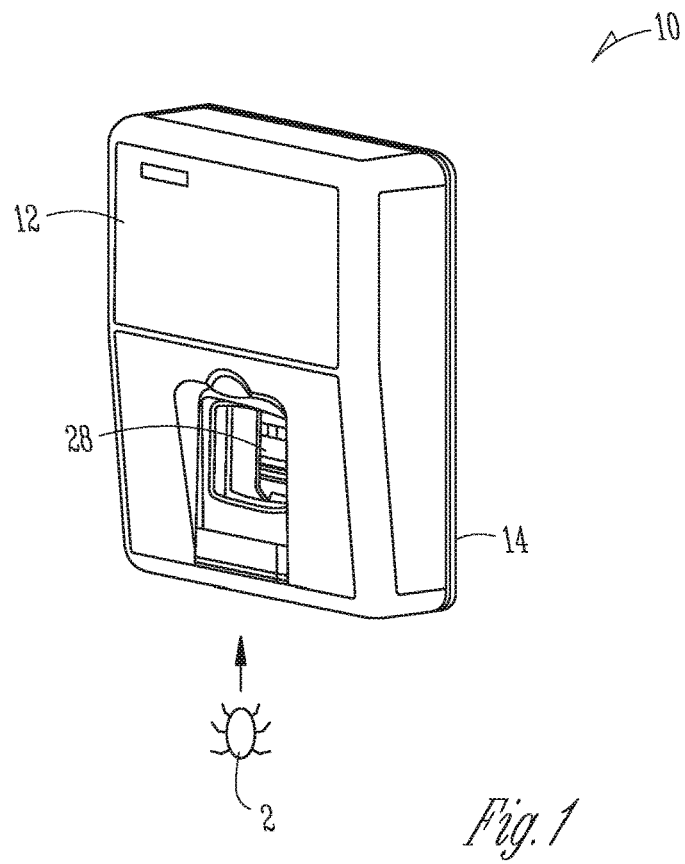
FIG. 1 is a perspective drawing of a pest detection device, according to one embodiment of the present subject matter.

The inventors of the present subject matter observed that sensing devices with smooth surfaces are not effective sensors because certain bugs and other pests cannot crawl across the smooth surface, reducing the likelihood of pest detection. In various embodiments, the present subject matter provides a surface that pests can climb on and over. In various applications, the design provides a capacitive sensor which comprises a solder mask over the top of capacitive sensor traces to add a texture which is easy for insects to climb over while still maintaining sensor sensitivity to detect even very small pests, such as bed bug nymphs. The solder mask can be applied across a multitude of substrates (i.e., circuit boards, capacitive sensing panels, etc.) to ensure optimal insect interaction. This approach allows for entry of pests to a sensing device over a number of different angles.

In various embodiments, the present subject matter allows for a pest detection device that can be mounted in a vertical or slanted configuration that enables pests to crawl into the sensing area. In various embodiments, the sensing area is covered with a coating having particles to provide better climbing traction for certain pests, such as bed bugs. In various embodiments, the coating is a solder mask that includes particles to create features that can be climbed by pests. In various embodiments, the coating includes pumice to provide better climbing traction for the pests. In various embodiments, the pest detection device includes a heater to lure pests that are attracted to heat, such as bed bugs. In various embodiments, the pest detection device includes a controller that is programmable to detect pests using a capacitive sensor disposed in the sensing area. In various embodiments, the pest detection device includes a power supply to allow for portable use of the pest detection device. In various embodiments, the pest detection device includes lights to indicate operation of the device, including, but not limited to capture of a pest. In various embodiments, sound, wireless signals, and other annunciators may be used for notification.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

This application incorporates by reference the entirety of U.S. Pat. No. 6,937,156, titled: Method and Apparatus for Capacitively Sensing Pests, which is owned by applicant Ecolab, Inc.

FIG. 1 is a perspective drawing of a pest detection device 10, according to one embodiment of the present subject matter. The pest detection device 10 includes circuitry within a housing 12 to perform various sensing functions. In various embodiments, the device 10 detects when a pest 2 has entered a sensor area 28. The present detection device 10 includes an improved sensor design, which can be mounted at any number of angles and enables climbing pests a surface that can be climbed on. In various applications it is mounted so that climbing pests, such as bed bugs, can climb up an incline into the sensor are 28 for detection. The housing 12 may include a back side 14 with an adhesive or other mounting apparatus to more easily attach the pest detection device 10 to a leg of a bed, wall, table leg, or some other leg or planar surface. In portable variations of the present pest detection device, the device will include one or more batteries (not shown) to operate without the need for conventional AC voltage from a wall outlet. In various embodiments, power may be provided by a plug for use with a conventional wall outlet.

Figure 2:
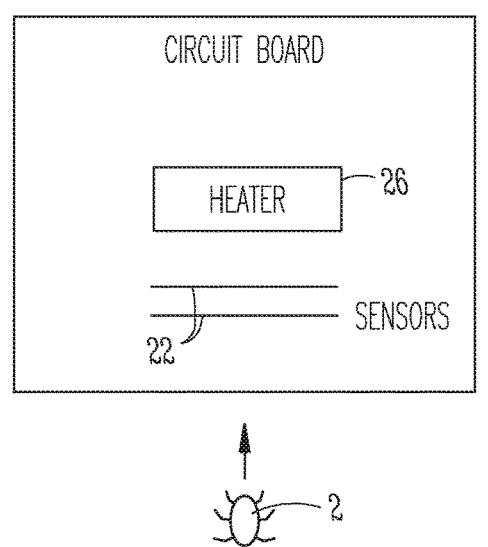
FIG. 2 is a plan view of a circuit board of the pest detection device of FIG. 1 showing a heater proximal to sensors, according to one embodiment of the present subject matter.

FIG. 2 is a plan view of a circuit board 16 of the pest detection device 10 of FIG. 1 showing a heater 26 to lure pests into the sensor area 28 having a plurality of sensors 22, according to one embodiment of the present subject matter. In embodiments designed to attract pests that sense heat, such as bed bugs, the device is configured with one or more heating elements to provide a heater 26 that is mounted on one side of the sensor so as to attract pests 2 for detection.

Figure 3:
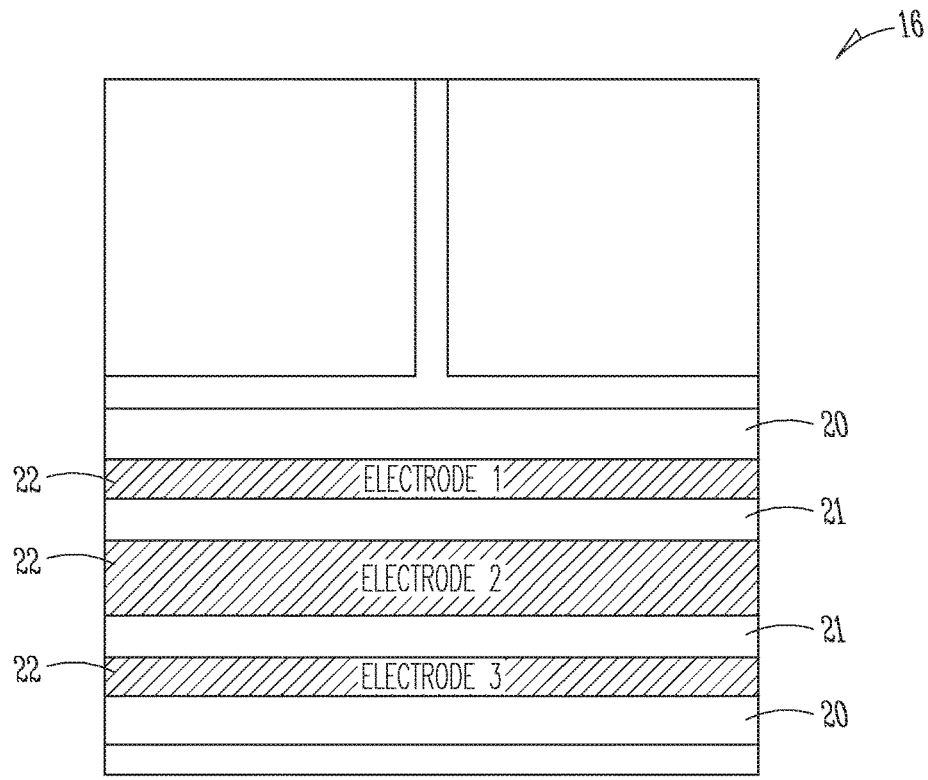
FIG. 3 shows a portion of the sensing area of the circuit board of FIG. 2, including the electrodes and shield, according to one embodiment of the present subject matter.

FIG. 3 shows a portion of the sensing area of the circuit board of FIG. 2, including the sensor electrodes 22 separated by insulator or gaps 21, according to one embodiment of the present subject matter. The design of FIG. 3 also includes shields 20 which are electrically separated from the sensor electrodes 22 by a gap or insulative region (not shown). In various embodiments, the connections to the sensor electrodes 22 and shields 20 are configurable so that each trace can be driven or sensed independently to allow for a plurality of driving and sensing configurations. In such embodiments, the traces on the board can be used differently for different applications.

For example, in one embodiment, the sensor traces 22 are sensed with respect to a circuit ground to measure self-capacitance. In various embodiments, the shield traces 20 can be driven to the supply voltage for enhanced sensing. In various embodiments, shield traces 20 can also be grounded, floating, or sinusoidally driven.

As another example, sensor traces 22 can be driven and sensed to perform mutual-capacitance measurements between the traces. In various embodiments, the shield traces 20 can be driven to the supply voltage for enhanced sensing. In various embodiments, shield traces 20 can also be grounded, floating, or sinusoidally driven.

In yet another example, the capacitive sensing can be performed using the shield traces if beneficial for any particular application. Such a configuration may be beneficial to add additional sets of capacitive sensors, and the connection to all traces is dependent on whether the design is employing self-capacitance or mutual-capacitance measurements. Other variations are possible without departing from the scope of the present subject matter.

In various embodiments a plurality of these sensors are used. In various embodiments two sensors are used. In various embodiments three sensors are used. In various embodiments four or more sensors are used. In various embodiments, the sensors are independent sensors that are configured to detect a pest over or about the sensor trace. In various embodiments the sensors are configured to detect a transition of a pest from one sensor to the next. In some embodiments, the sensors are highly symmetrical in size and shape. In some embodiments a diversity of sensor sizes are employed to give different detection capabilities. In various embodiments the sensing electronics are multiplexed over the sensors. In various embodiments the sensing electronics include a plurality of sensing circuits that include a circuit for each sensor. In various embodiments the circuits are homogeneous to make substantially similar detections. In various embodiments the circuits are adjustable to allow for different sensing sensitivities. In various embodiments the sensing circuits are programmable to allow for adjustable sensing approaches.

In variations for the foregoing embodiments, a conductive shield layer may be disposed beneath the sensor traces in various patterns to benefit capacitive sensing on the side of the circuit that the pests crawl upon.

Figure 4:
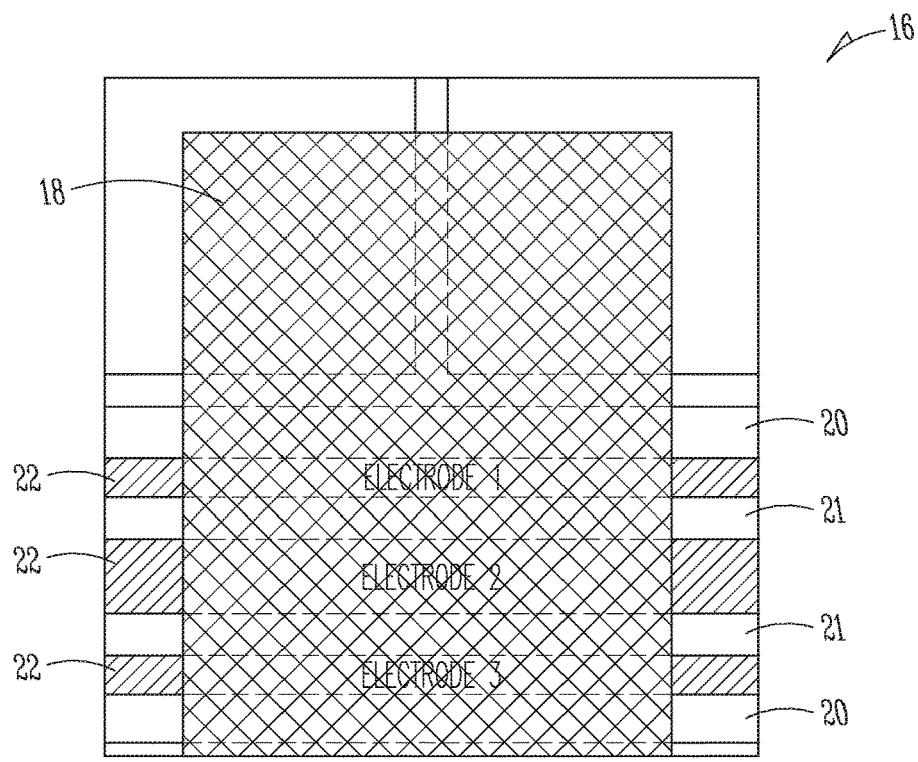
FIG. 4 shows that portion of the sensing area of the circuit board of FIG. 3 with a textured coating, according to one embodiment of the present subject matter.

FIG. 4 shows a portion of the sensing area of the circuit board 16 of FIG. 3 with a textured coating 18 which is disposed over the sensors 22, according to one embodiment of the present subject matter. In this embodiment, the capacitive sensors employ conductive shields 20 and trace electrodes 1, 2, and 3 (22) that are connected to electronics to sense a change in capacitance of the electrodes with respect to the shields 20. The configuration and number of electrodes and shield may vary without departing from the scope of the present subject matter.

In various embodiments sensing electronics are connected to sensor traces to sense any changes in capacitance and to provide a signal for detecting the presence of a pest. In various embodiments electronics are connected to sensor traces to drive certain traces and to sense others, so as to create a capacitive sensor that detects changes in the capacitance about the sensing elements.

In the various embodiments, when a pest 2 enters a capacitive sensing area on the capacitive sensor a change in the capacitance is detected and the device can act on that detection. Capacitive sensing of pests, such as bugs, of different size, movement and type can be detected using traces of varying thickness and width. The capacitance changes can be used to interpret a signal of the added or varying capacitance of an unknown bug. In various applications, multiple traces (e.g., two or more) of different thickness and widths and thus different natural capacitances, are employed to provide characteristic sense profiles of different bugs. In this way for example, a bedbug can be differentiated from a cockroach or a moving alive insect can be differentiated from a dead one. In various embodiments, a remote user can be supplied with detection information using a wireless communications module or other wireless technology in the sensing device.

In various embodiments, capacitive sense circuits can sense mutual capacitance where the sense circuit is connected between a transmit electrode and a receive electrode or self-capacitance where sense circuit is wired between transmit electrode and ground (or some other conductive surface). Such approaches can be used to detect presence of insects using the capacitance equation:

$$C = \frac{\varepsilon_0 \times \varepsilon_r \times A}{T}$$

where:
$\varepsilon_r$: is the relative dielectric constant of overlying dielectric material;
$\varepsilon_0$: is the capacitance per meter of free space ($8.85 \times 10^{12}$ F/m);
T: is the thickness of the overlying dielectric material; and
A: is the area of region touched by or spanned by the pest/insect.

Figure 5:
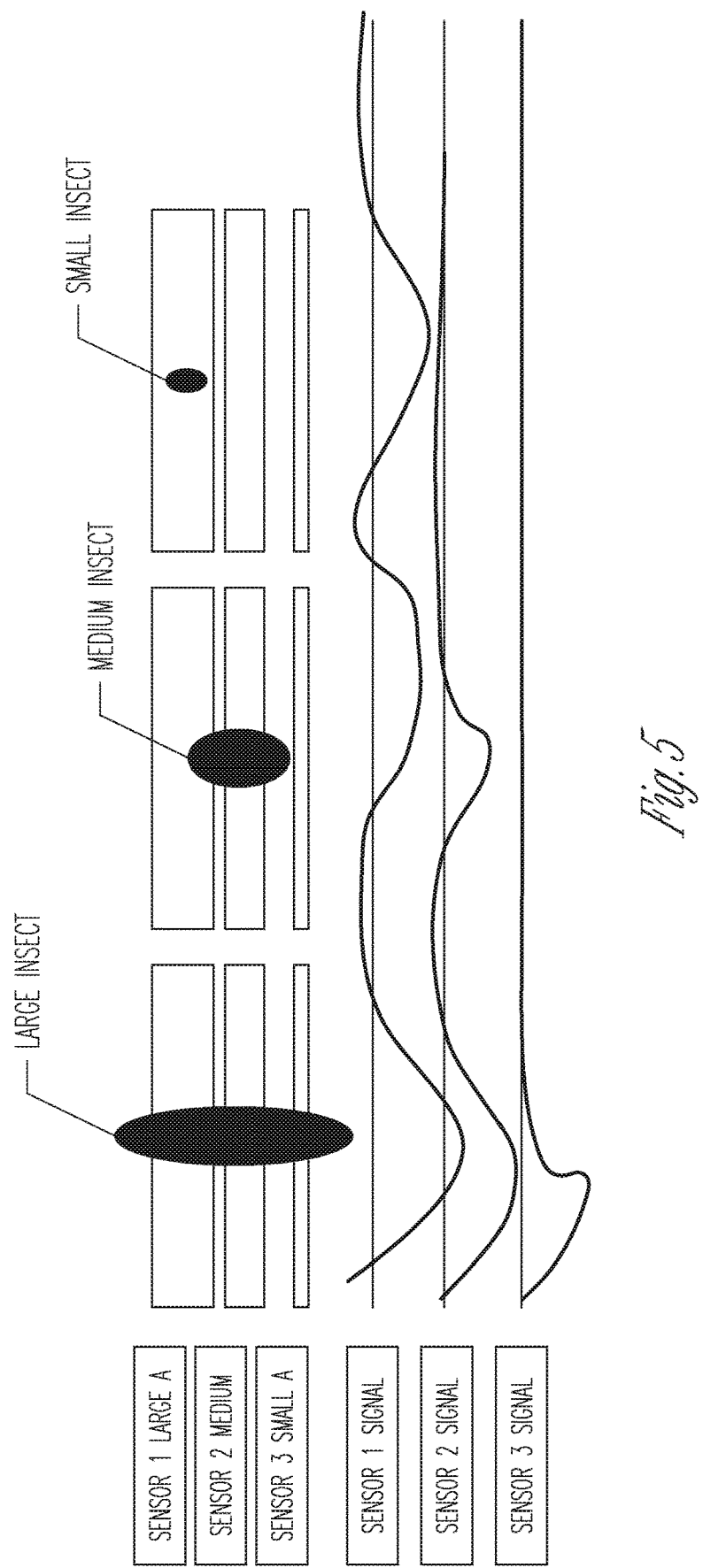
FIG. 5 is a chart showing various signals based on pest (insect) size over a capacitive sensor, according to one embodiment of the present subject matter.

FIG. 5 is a chart showing various signals based on pest (insect) size over a capacitive sensor, according to one embodiment of the present subject matter. The signals produced by the various sensors and pests are correlated and may be proportional to the capacitance equation provided above. Sensor 1 is a larger sensor trace than sensors 2 and 3. Accordingly, sensor 1's measurements are more pronounced due to the larger trace dimensions for sensor 1 than for sensors 2 and 3. The chart also shows that larger insects produce more signal than the smaller insects. Consequently, larger sensor electrodes can be used to detect the presence of smaller insects. If the detection is limited to a known pest size, then a smaller sensor dimension may be sufficient for such designs. One of skill in the art would appreciate embodiments where the sensor dimensions are homogeneous and embodiments where there is diversity in sensor size and/or placement.

Figure 8A:
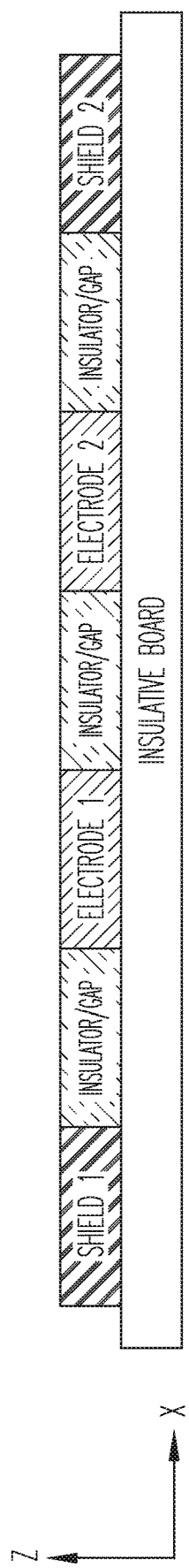
FIGS. 8A and 8B are cross-sectional and plan views of a sensor design including two electrodes, according to one embodiment of the present subject matter.
Figure 8B:
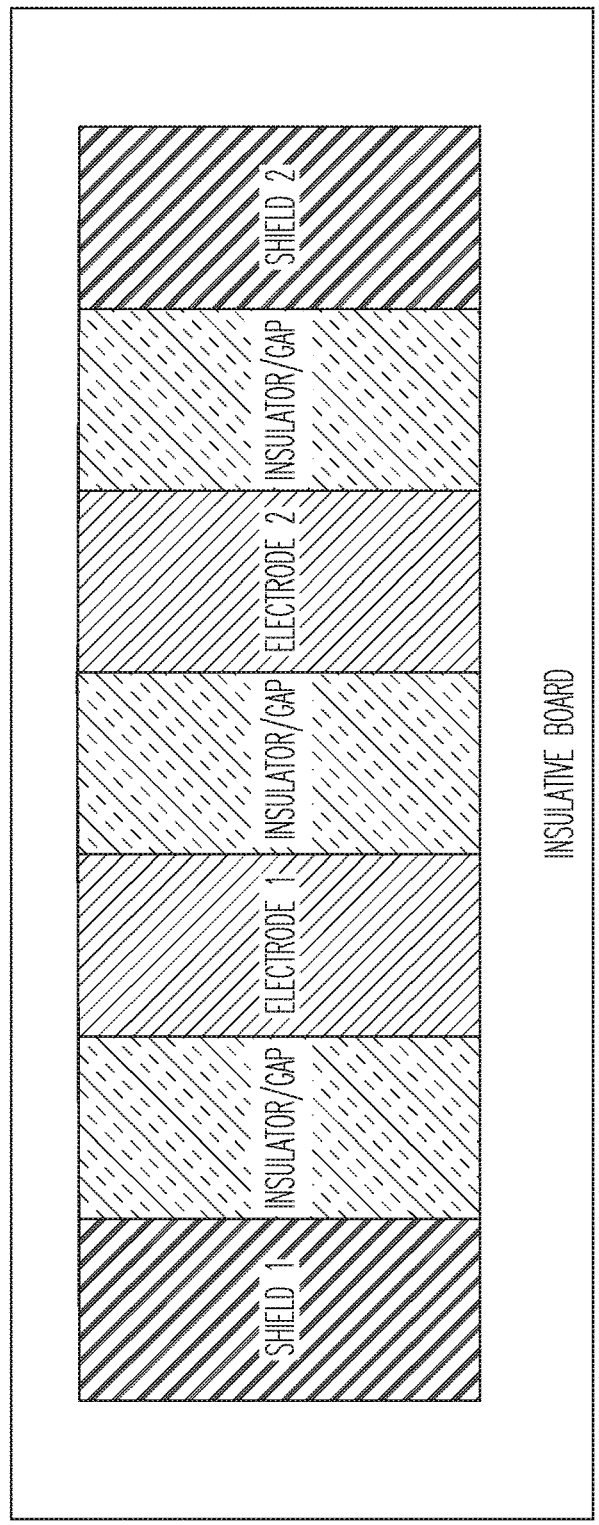

FIGS. 8A and 8B are cross-sectional and plan views of a sensor design including two electrodes, according to one embodiment of the present subject matter. An insulative coating is disposed over all of the traces. A textured coating may be used as needed and described herein. The sensor drawings are not to scale but are intended to show the traces and their insulative portions. A person of skill in the art would appreciate that the connections to the electrodes and to the shields can vary depending on the intended sensing approach.

In various embodiments, electrodes 1 and 2 are used in a self-capacitance measuring mode where voltage changes between each electrode and the circuit ground are detected when a pest crawls above the electrode. It is understood that the sensors can be sensed independently to determine pest activity at different locations on the sensing surface. In variations of the circuit, the shields may be driven to a high voltage to reduce noise on the sensing of the electrodes. The shields may be driven to ground, sinusoidally driven or floating in various combinations for different applications. The shields may alternatively be sensed or driven as needed for various sensing applications.

In various embodiments, electrodes 1 and 2 are used in a mutual-capacitance measuring mode where voltage changes on a sensed electrode and a driven electrode are detected when a pest crawls above either electrode. In variations of the circuit, the shields may be driven to a high voltage to reduce noise on the sensing of the electrodes. The shields may also be driven to ground, sinusoidally driven or floating in various combinations for different applications. The shields may alternatively be sensed or driven as needed for various sensing applications.

Figure 9A:
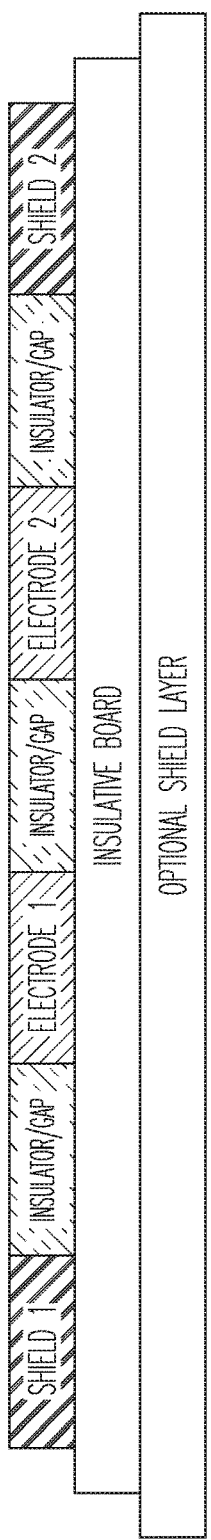
FIGS. 9A and 9B are cross-sectional and plan views of a sensor design including two electrodes and an optional shield layer, according to one embodiment of the present subject matter.
Figure 9B:
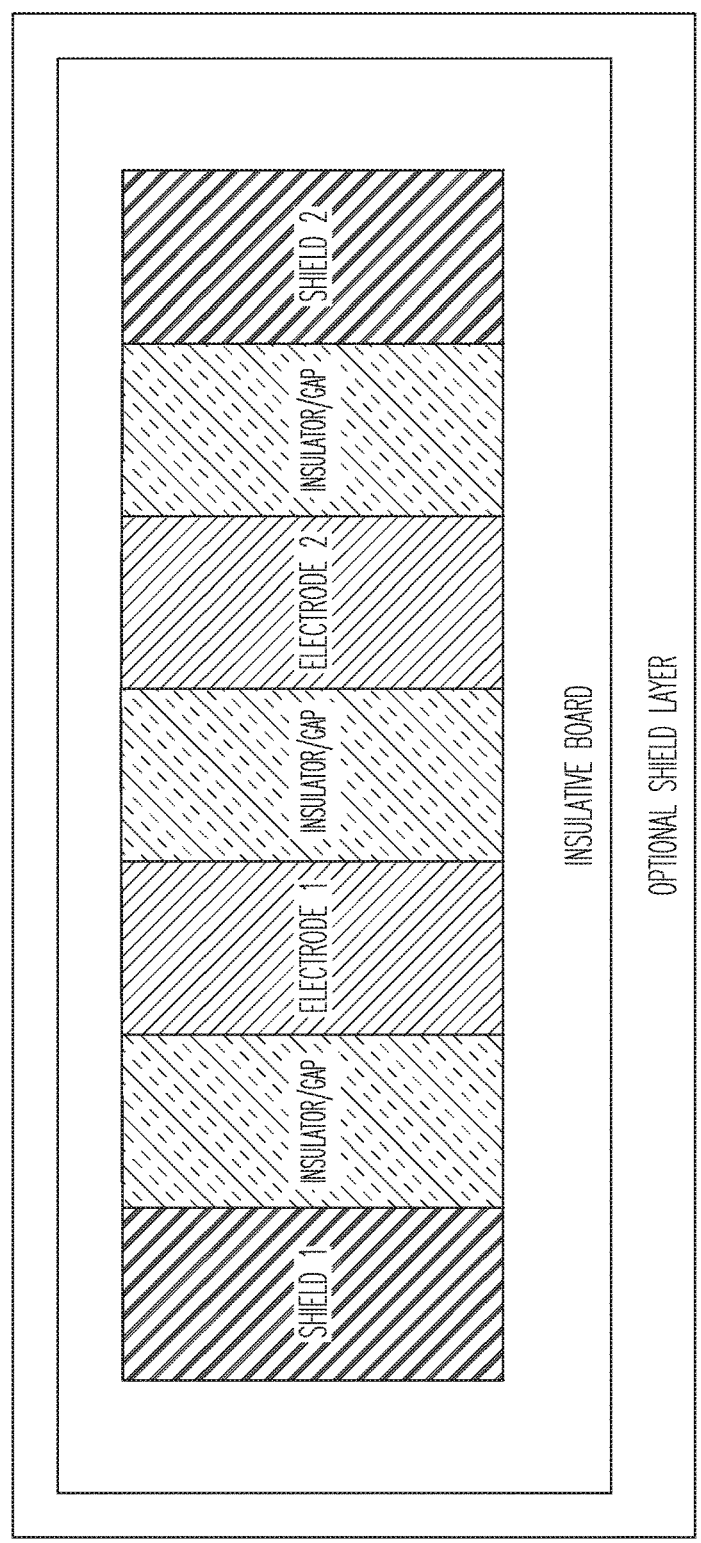

Another variation of the circuit design of FIGS. 8A and 8B is shown in FIGS. 9A and 9B. FIGS. 9A and 9B are cross-sectional and plan views of a sensor design including two electrodes and an optional shield layer under the traces, according to one embodiment of the present subject matter. Such a shield may be driven to a potential, floating, or sinusoidally driven as required by the circuit. Various configurations of the metal shield layer below may be used to enhance sensing on the top portion of the sensor where pests are detected and so as to reduce false detections from movement on the opposite side of the sensor.

Figure 10:
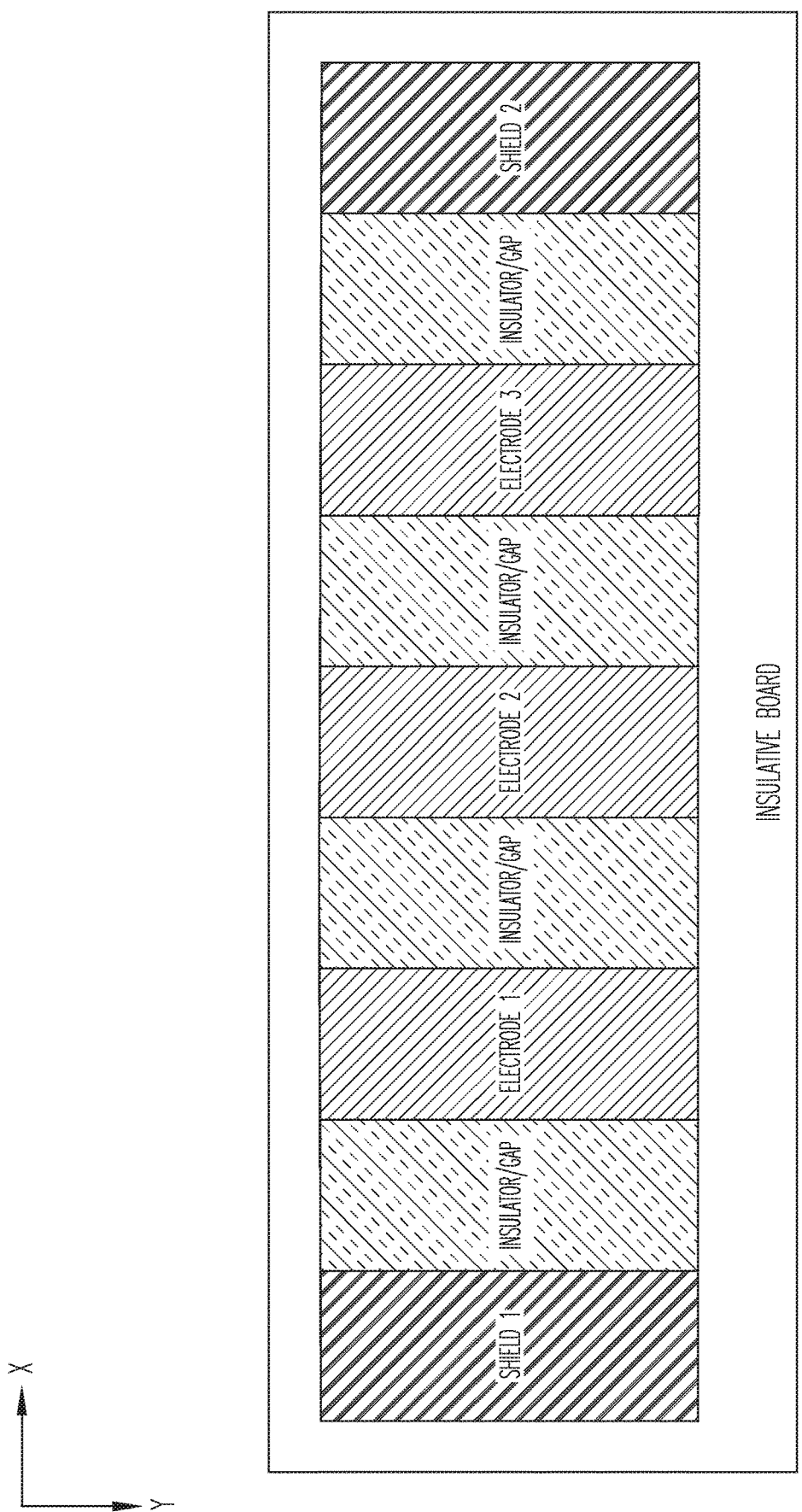
FIG. 10 is a plan view of a sensor design including three electrodes, according to one embodiment of the present subject matter.

Other numbers of electrodes may be employed. For example, FIG. 10 is a plan view of a sensor design including three electrodes, according to one embodiment of the present subject matter. A skilled person would appreciate that the electrodes and shields may be sensed or driven as needed to realize a desired circuit configuration.

In various embodiments, electrodes 1, 2 and 3 are used in a self-capacitance measuring mode where voltage changes between each electrode and the circuit ground are detected when a pest crawls above each electrode respectively. It is understood that the sensors can be sensed independently to determine pest activity at different locations on the sensing surface. In variations of the circuit, the shields may be driven to a high voltage to reduce noise on the sensing of the electrodes. The shields may be driven to ground, sinusoidally driven or floating in various combinations for different applications. The shields may alternatively be sensed or driven as needed for various sensing applications.

In various embodiments, electrodes 1, 2 and 3 are used in a mutual-capacitance measuring mode where voltage changes on a sensed electrode and a driven electrode are detected when a pest crawls above either electrode. In variations of the circuit, the shields may be driven to a high voltage to reduce noise on the sensing of the electrodes. The shields may also be driven to ground, sinusoidally driven or floating in various combinations for different applications. The shields may alternatively be sensed or driven as needed for various sensing applications.

Figure 11:
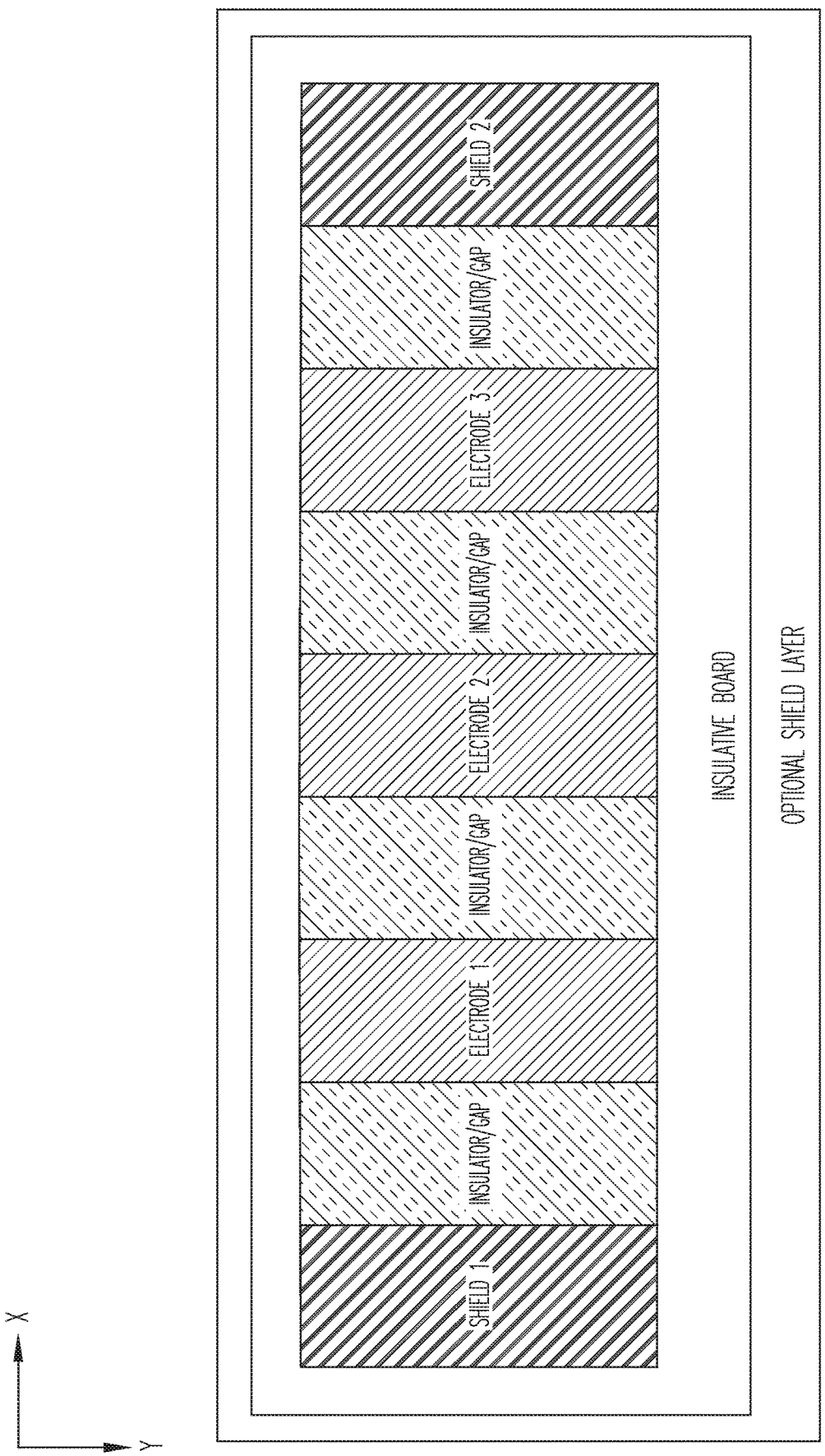
FIG. 11 is a plan view of a sensor design including three electrodes and an optional shield layer, according to one embodiment of the present subject matter.

FIG. 11 is a plan view of a sensor design including three electrodes and an optional shield layer under the traces of the design of FIG. 10, according to one embodiment of the present subject matter. Such a shield may be driven to a potential, floating, or sinusoidally driven as required by the circuit. Various configurations of the metal shield layer below may be used to enhance sensing on the top portion of the sensor where pests are detected and so as to reduce false detections from movement on the opposite side of the sensor.

Figure 6:
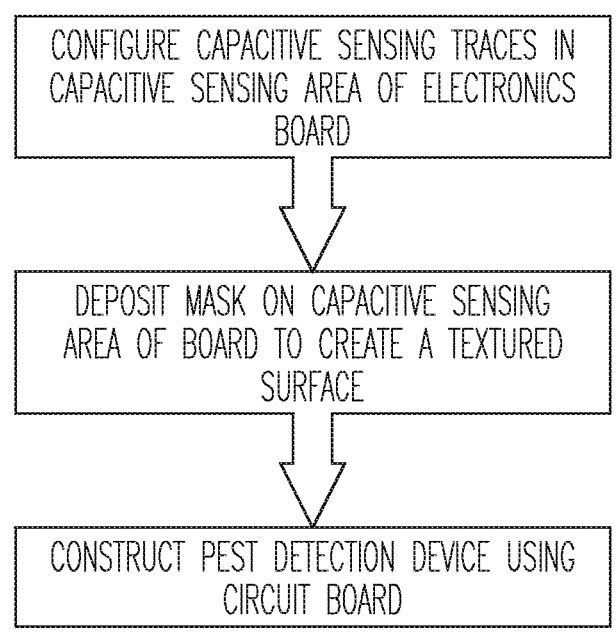
FIG. 6 is a process flow diagram for producing a sensor with a coating to allow for pests to climb on the sensing area of a pest detection device, according to one embodiment of the present subject matter.

FIG. 6 is a coating process for coating a sensor surface to allow for pests to climb on a capacitive sensing area of the pest detection device, according to one embodiment of the present subject matter. The capacitive sensing traces are configured and then a mask is deposited over the traces. In various embodiments, the sensing area is covered with a mask having particles to provide better climbing traction for certain pests, such as bed bugs. The particles may be suspended in a paste or slurry that provides a textured surface after it dries on the printed circuit board. A number of particles may be used including, pumice, sand, salt, or any material that can produce the desired grit or texture to allow insects to crawl on the surface. In various embodiments, the particles include pumice that is mixed into a solder mask liquid and applied to the circuit board to provide better climbing traction for the pests. In various embodiments, the sensor surface has a minimum MT-11007 of texture to climb about a 45-degree angle from vertical. Such a surface may not be reproduced using injection molding, as such processes fail to provide adequate ledges, undercuts, or other structure for the pests (e.g., bed bugs) to climb and can be too slippery for them to grasp.

Figure 7:
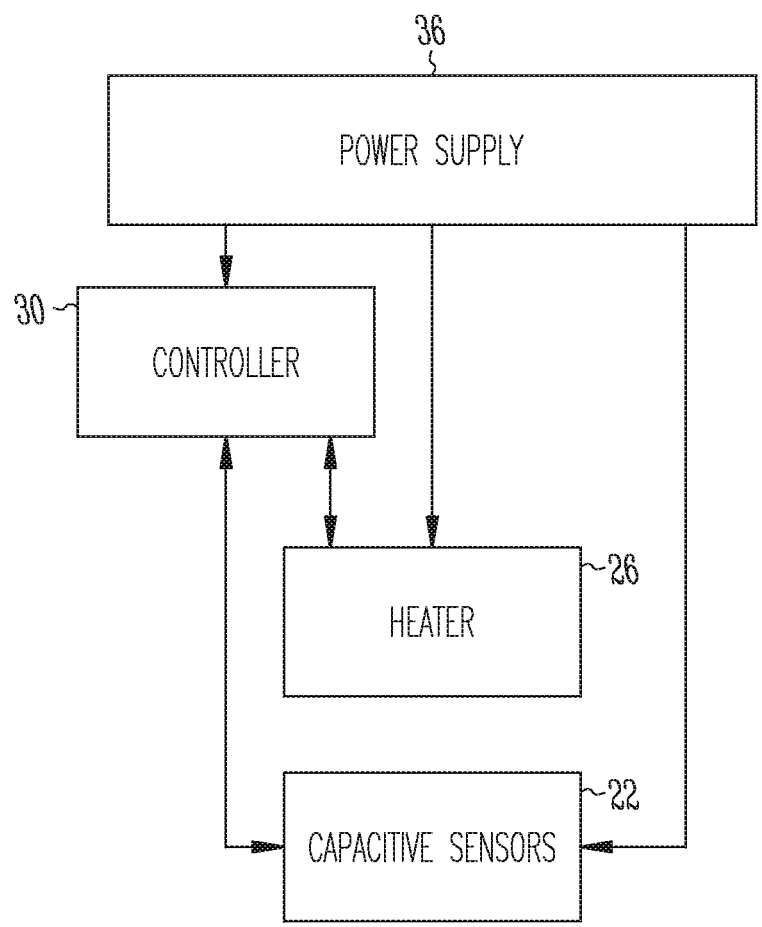
FIG. 7 is block diagram of a circuit for detection of pests, according to one embodiment of the present subject matter.

FIG. 7 is a block diagram of the pest detection device electronics, according to one embodiment of the present subject matter. Power supply 36 is configured to provide power to the controller 30. The power supply 36 can also provide current to the heater 26 and to the capacitive sensors 22. The controller 30 can be a microcontroller, a microprocessor, dedicated logic, a field programmable gate array, a digital signal processor, or some other kind of processor or combinational logic. In portable variations of the present pest detection device, the device will include one or more batteries (not shown) to operate without the need for conventional AC voltage from a wall outlet. In various embodiments, the power may be provided by a plug for use with a conventional wall outlet.

In various embodiments, a detection circuit includes a controller in communication with the traces to drive or sense the sensor traces. In various embodiments, the controller includes a processor that is highly programmable using the programming language of the microcontroller, microprocessor, or digital signal processor. In various embodiments, the detection circuit includes combinational logic. In various embodiments, the detection circuit includes a field programmable gate array. Those skilled in the art will appreciate that a number of different hardware and programming options are afforded to the designer to support a number of functions of the device.

In various embodiments, the controller is programmable to capture a pest when entering the sensing area for identification purposes and to provide a notification of the capture. In various embodiments, the pest detection device includes lights to indicate operation of the device, including, but not limited to capture of a pest. In various embodiments other annunciators are used for notification. In various embodiments, the system includes a wireless circuit to provide wireless communications. The wireless communications may be wi-fi signals, Bluetooth signals, or other dedicated radio signals. The wireless communications may also communications for operating the device remotely. In various embodiments, an optional camera can be mounted in the sensing chamber to provide a remote viewing of any pests caught by the device, and to optionally allow the device to release the pests. Those of skill in the art will appreciate the highly programmable nature of the present system.

EXAMPLES

The present disclosure provides, among other things a pest detection device having a textured sensor and methods for making same. In various examples, the present pest detection device comprises: a capacitive sensor coated at least in part with a coating that allows climbing pests to climb across a sensing surface even if disposed at an angle. In some examples, the coating is a solder mask and the solder mask includes pumice. In some examples, the sensor may include two, three or any number of a plurality of independent capacitive sensors. In some examples, at least one of the capacitive sensors includes a trace that is of a different size or shape than a trace of another capacitive sensor of the plurality of capacitive sensors. In some examples, each sensor includes a conductive trace disposed above a conductive shield layer. In some examples, each conductive trace is further disposed adjacent a shield trace and is insulated from the shield trace.

In various examples, the device further comprises electronics to measure mutual capacitance of each sensor or to measure self-capacitance of each sensor with respect to ground.

In various examples of the pest detection device, the capacitive sensors are traces on a circuit board and a solder mask is disposed over at least part of the sensors.

In various examples of the pest detection device the electronics comprises a controller connected to at least one trace to detect capacitance changes. In various examples of the pest detection device the controller includes a microprocessor, microcontroller, digital signal processor or other programmable logic.

The present disclosure also provides methods for making a circuit board. Such methods include disposing a plurality of traces on an insulative circuit board, coating at least a portion of the board with a dielectric material, and coating a least a portion of the board with a solder mask a material to create a textured surface that pests can more easily climb. In some examples, the material is pumice. In some examples, the method includes disposing the board in a housing for a pest detection device. In some examples, the method further includes instructing positioning of the pest detection device at an incline so that bed bugs can climb onto the textured surface and be detected with the device.

The foregoing examples are not intended to be an exhaustive or exclusive list of examples and variations of the present subject matter. The above description is intended to be illustrative, and not restrictive. Those of skill in the art will appreciate additional variations of the embodiments that can be used within the scope of the teachings set forth herein. The scope of the invention should be determined with reference to the appended claims, along with the full scope of equivalents to which such claims are entitled.

The invention claimed is:

1. A pest detection device, comprising:
a capacitive sensor coated at least in part with a coating that allows climbing pests to climb across a sensing surface disposed at a nonhorizontal angle, wherein the coating has at least MT-11007 of texture.

2. The pest detection device of claim 1, wherein the coating is a solder mask and the solder mask includes pumice.

3. The pest detection device of claim 2, wherein the sensor includes two independent capacitive sensors.

4. The pest detection device of claim 2, wherein the sensor includes three independent capacitive sensors.

5. The pest detection device of claim 2, wherein the sensor includes a plurality of independent capacitive sensors.

6. The pest detection device of claim 5, wherein at, least one of the capacitive sensors includes a trace that is of a different size or shape than a trace of another capacitive sensor of the plurality of capacitive sensors.

7. The pest detection device of claim 5, wherein each sensor includes a conductive trace disposed above a conductive shield layer.

8. The pest detection device of claim 6, wherein each conductive trace is further disposed adjacent a shield trace and is insulated from the shield trace.

9. The pest detection device of claim 7, wherein at east one of the capacitive sensors includes a trace that is of a different size or shape than a trace of another capacitive sensor of the plurality of capacitive sensors.

10. The pest detection device of claim 4, wherein at least one of the capacitive sensors includes a trace that is of a different size or shape than a trace of another capacitive sensor of the plurality of capacitive sensors.

11. The pest detection device of claim 5, further comprising electronics to measure mutual capacitance of pairs of sensor traces.

12. The pest detection device of claim 5, further comprising electronics to independently measure self-capacitance of each sensor with respect to ground.

13. The pest detection device of claim 5, wherein the capacitive sensors are traces on a circuit board and the solder mask is disposed over at least part of the sensors.

14. The pest detection device of claim 11, wherein the electronics comprises a controller connected to at least one trace to detect capacitance changes.

15. The pest detection device of claim 14, wherein the controller includes a microprocessor.

16. The pest detection device of claim 14, wherein the controller includes a microcontroller.

17. A method for making a circuit board, comprising:
disposing a plurality of traces on an insulative circuit board;
coating at least a portion of the board with a dielectric material; and
coating a least a portion of the board with a solder mask a material to create a textured surface that pests can more easily climb when the circuit board is nonhorizontal, wherein the textured surface has at least MT-11007 of texture.

18. The method of claim 17, wherein the material to create the textured surface includes pumice.

19. The method of claim 18, further comprising disposing the board in a housing for a pest detection device.

20. The method of claim 18, further comprising instructing positioning of the pest detection device at an incline so that bed bugs can climb onto the textured surface and be detected with the device.

21. The pest detection device of claim 1, wherein the capacitive sensor is inclined at about a 45-degree angle from vertical.

22. The pest detection device of claim 1, wherein the coating comprises pumice.

23. The pest detection device of claim 17, wherein the capacitive sensor is inclined at about a 45-degree angle from vertical.

24. The pest detection device of claim 17, wherein the textured surface comprises pumice.

* * * * *